US012729004B2

(12) United States Patent
Nardin

(10) Patent No.: US 12,729,004 B2
(45) Date of Patent: Sep. 8, 2026

(54) LIFESAVING COCOON FOR USE DURING TRAVEL

(71) Applicant: Alberto Nardin, Regina (CA)

(72) Inventor: Alberto Nardin, Regina (CA)

( * ) Notice: Subject to any disclaimer, the term of this patent is extended or adjusted under 35 U.S.C. 154(b) by 144 days.

(21) Appl. No.: 18/429,744

(22) Filed: Feb. 1, 2024

(65) Prior Publication Data

US 2024/0262514 A1 Aug. 8, 2024

Related U.S. Application Data

(60) Provisional application No. 63/443,088, filed on Feb. 3, 2023.

(51) Int. Cl.
*B64D 25/12* (2006.01)
*A62B 31/00* (2006.01)

(52) U.S. Cl.
CPC .............. *B64D 25/12* (2013.01); *A62B 31/00* (2013.01)

(58) Field of Classification Search
CPC .. B64D 11/0616; B64D 25/12; B60N 2/6009; A47C 7/66; A47C 7/666; A47C 29/00; A47C 29/006
See application file for complete search history.

(56) References Cited

U.S. PATENT DOCUMENTS 1,626,796 A * 5/1927 Drabenstott ........... B64D 25/12 244/141
2,166,832 A * 7/1939 Wenker .................... A47C 7/66 135/96
2,243,984 A * 6/1941 Singewald ............. A47C 1/143 135/96
2,733,027 A * 1/1956 Gero ...................... B64D 25/12 244/140
2,806,666 A * 9/1957 Brown ................... B64D 25/12 244/140
2,985,413 A * 5/1961 Von Beckh Widmanstetter ......... B64D 25/12 244/118.6

(Continued)

FOREIGN PATENT DOCUMENTS

CA 2502381 A1 * 10/2006 ............. A62B 99/00
CN 101857007 A * 10/2010 ............. B64C 1/062

(Continued)

*Primary Examiner* — Joseph W Sanderson
(74) *Attorney, Agent, or Firm* — Adrian D. Battison; Ryan W. Dupuis; Ade & Company Inc.

(57) ABSTRACT

Apparatus provides a lifesaving, cocoon and includes a seat arranged to be mounted in a passenger transportation and a pod unit with rounded, semi-rigid walls surrounding and securely enclosing a human body on the seat. The pod unit has an outer skin of a flexible material supported on a generally helical wire interior frame which is coiled into a generally oval exterior shape with upper and lower ends which are narrower than a central area. The outer skin of the pod unit can be made of spider silk or any flexible light-weight material. The helical wire frame upon which the skin is stretched over is made of a strong and flexible material which allows the frame to flex to different locations with the skin carried thereby and remaining stretched thereon. The pod can include transport specific additions such as a parachute and/or flotation and may be separable from the vehicle in the event of a collision.

20 Claims, 1 Drawing Sheet

(56) References Cited

U.S. PATENT DOCUMENTS

| | | | | |
|---|---|---|---|---|
| 2,986,361 | A * | 5/1961 | Codding | B64D 25/12 338/68 |
| 3,236,480 | A * | 2/1966 | Stott | B64D 25/12 244/122 AD |
| 4,739,953 | A * | 4/1988 | Soffiantini | B64D 25/12 244/122 AG |
| 5,171,059 | A * | 12/1992 | Patrick | A47C 7/666 135/901 |
| 5,297,761 | A * | 3/1994 | Kendall, Jr. | B64D 25/12 244/140 |
| 6,036,261 | A * | 3/2000 | Woods | B60N 2/6009 297/487 |
| 6,224,018 | B1 * | 5/2001 | Hinestroza | B60N 2/43 244/140 |
| 6,283,347 | B1 * | 9/2001 | Roh | A47C 7/66 224/160 |
| 6,908,148 | B2 * | 6/2005 | Wang | B60N 2/28 297/184.13 |
| 9,027,886 | B1 * | 5/2015 | Mechels | B64D 17/60 244/151 R |
| 9,795,222 | B2 * | 10/2017 | Piispanen | A47C 7/626 |
| 10,863,734 | B1 * | 12/2020 | George | A47C 7/666 |
| 10,888,479 | B1 * | 1/2021 | Gershon | A61G 3/008 |
| 11,413,987 | B2 * | 8/2022 | Sjostrom | B64C 1/20 |
| 11,590,442 | B2 * | 2/2023 | Misawa | B64D 11/0632 |
| 12,098,565 | B2 * | 9/2024 | Aliberti | E04H 15/58 |
| 2002/0112752 | A1 * | 8/2002 | Blakney | E04H 15/003 135/96 |
| 2004/0245812 | A1 * | 12/2004 | Wang | A47D 15/00 297/184.13 |
| 2008/0203774 | A1 * | 8/2008 | Hemetsberger | A47C 7/666 297/16.2 |
| 2009/0233505 | A1 * | 9/2009 | Kwok | B60R 21/16 441/80 |
| 2011/0233341 | A1 * | 9/2011 | Monteforte | B64D 25/12 244/140 |
| 2014/0304909 | A1 * | 10/2014 | Piispanen | A47C 1/13 5/12.1 |
| 2016/0137301 | A1 * | 5/2016 | Jackson | B64D 25/12 244/118.6 |
| 2018/0055232 | A1 * | 3/2018 | Denobriga | A47C 31/113 |
| 2021/0061134 | A1 * | 3/2021 | Sjostrom | B60N 2/01508 |
| 2021/0370212 | A1 * | 12/2021 | Misawa | B64D 11/0626 |
| 2022/0154487 | A1 * | 5/2022 | Michaels | E04H 15/02 |
| 2023/0142872 | A1 * | 5/2023 | Alfadil | B64D 11/00 244/122 AE |
| 2023/0329442 | A1 * | 10/2023 | Cuff | A47C 7/622 |
| 2024/0017853 | A1 * | 1/2024 | Plebuch | B60N 3/06 |
| 2024/0209653 | A1 * | 6/2024 | Aliberti | E04H 15/405 |
| 2025/0019080 | A1 * | 1/2025 | Bey | B64D 25/12 |

FOREIGN PATENT DOCUMENTS

| | | | | | |
|---|---|---|---|---|---|
| CN | 203676595 | U | * | 7/2014 | A47C 1/143 |
| CN | 114537234 | A | * | 5/2022 | B60N 2/2884 |
| DE | 102009025509 | A1 | * | 12/2010 | B64D 25/12 |
| DE | 102018008115 | A1 | * | 4/2020 | A47C 7/666 |
| DE | 102019118842 | A1 | * | 1/2021 | B60N 2/10 |
| DE | 102019118845 | A1 | * | 1/2021 | B60R 21/207 |
| DE | 102020103788 | A1 | * | 8/2021 | B60N 2/6009 |
| FR | 2762584 | A1 | * | 10/1998 | B64D 25/12 |
| GB | 2025763 | A | * | 1/1980 | A47C 7/666 |
| KR | 20190008725 | A | * | 1/2019 | A47C 7/72 |
| WO | WO-2011047692 | A1 | * | 4/2011 | B64D 11/0632 |
| WO | WO-2017033033 | A1 | * | 3/2017 | B64D 25/08 |

* cited by examiner

FIG. 1
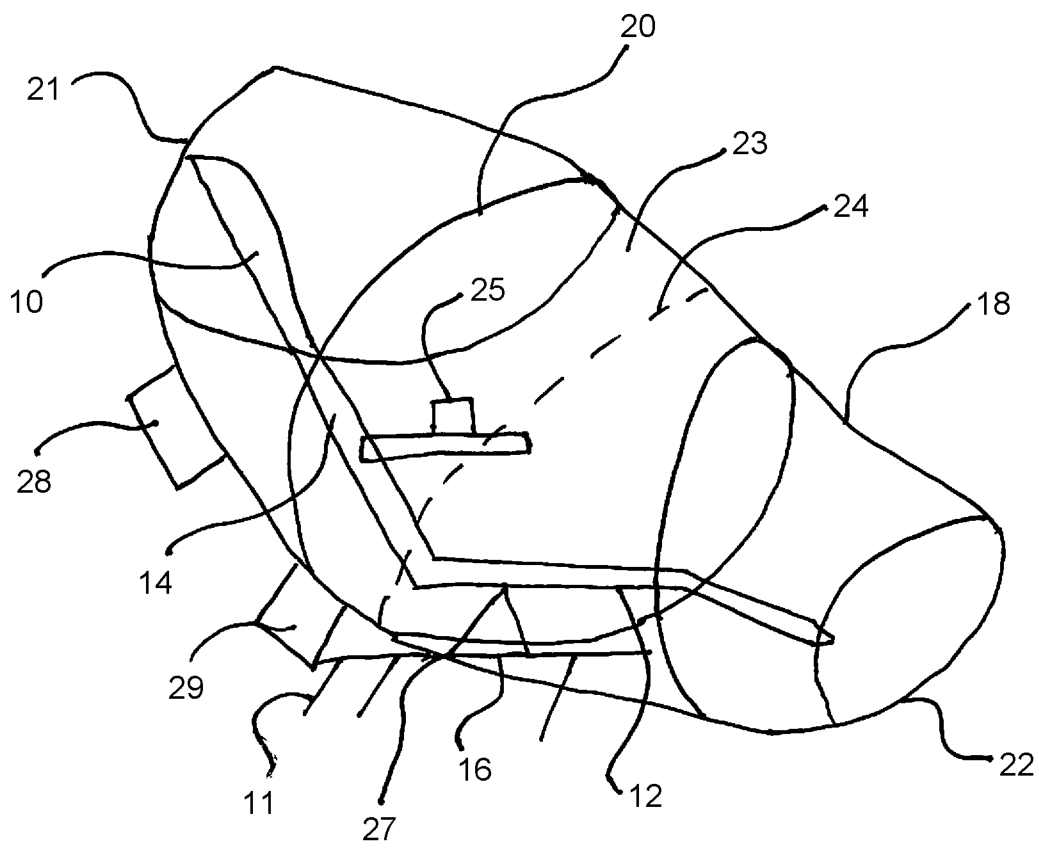
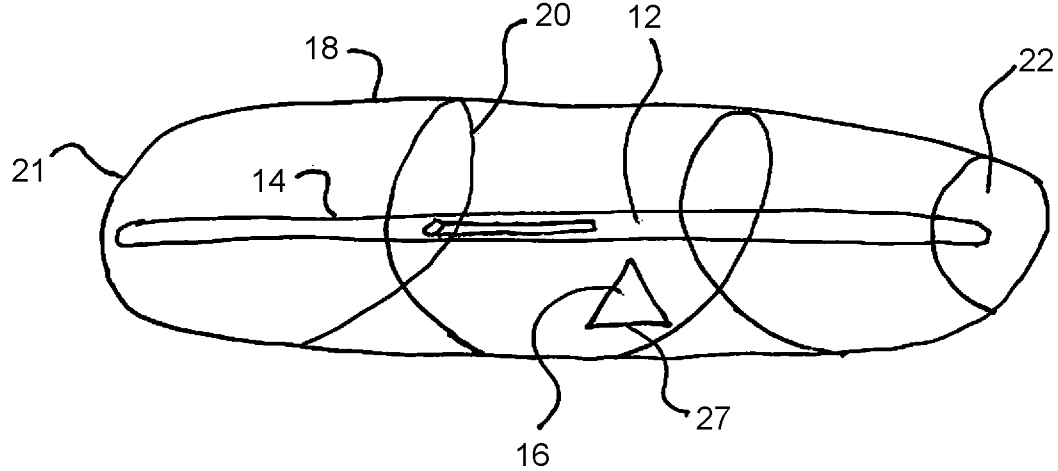
FIG. 2

LIFESAVING COCOON FOR USE DURING TRAVEL

This invention relates to a device arranged to provide a lifesaving cocoon during travel, allowing its occupant safe and peaceful rest.

SUMMARY OF THE INVENTION

The device as disclosed herein comprises a bubble-like pod unit, a cocoon, with rounded, semi-rigid walls surrounding and securely enclosing a human body within. The skin of the cocoon is made of a durable, flexible material, such as Spider Silk (stronger than steel, tougher than Kevlar, lightweight, flexible, heat and chemical resistant), or a harder, lightweight material such as carbon fibre.

The frame of the cocoon, upon which the skin is stretched over, is made of a strong and flexible metal, such as titanium, and takes the form of a hollow coil shape such as a "Slinky" toy. The unit is oval shaped, looking like a life-sized pill, when fully closed. The top half opens by sliding partially under the bottom half, leaving an opening for a large occupant to easily enter and exit. Inside the pod, the occupant sits on a fully reclining airplane style seat. Reclining is controlled manually or electronically. The flexibility of the Spider Silk material allows the form of the pod to adapt as the occupant changes seating positions.

The device as disclosed herein connects to the interior of any mode of transportation. This connection is via a standard coupler system which is designed to break away in case of major impact. For example: in an airplane, if a major catastrophe occurs mid-flight resulting in the breakup of the aircraft, the cocoon device will remain intact, preserving its functionality while breaking free from the fuselage. Once disconnected and essentially free falling from the sky, a parachute deploys for a safe landing. Another form of connection for the pod to the mode of transportation is via an electromagnetic system. This system is also designed to release the pod in the case of a break-up of the surrounding vehicle. The connection method to a given mode of transportation will vary depending upon the installation options in any particular interior.

While travelling, being inside the device significantly raises one's survival probability in the case of a vehicular, aircraft, sea-craft, or train accident. Apart from the above mentioned safety seat, the pod contains airbags, and other options depending upon the transportation type. The device when used in an aircraft may have a global transponder, a parachute on the exterior and has flotation making it unsinkable. The device when used in a water craft has again flotation devices making it unsinkable and also has a transponder and signaling system.

The device as disclosed herein is not typically airtight, however, such a version is available which uses a battery operated ventilator. Airtight versions, in large passenger aircraft, cruise ships and trains, also help keep the occupants free from direct contact with viruses. Inside such passenger transporters, either the entire craft is equipped with only seating using this cocoon, or it is offered as an option in a specific cabin class.

The device as disclosed herein is especially useful in self-driving or autonomous vehicles. Inside such a passenger vehicle, the device is either installed in the passenger seat position, or behind the two front seats, crosswise, using up the entire rear seat space when fully reclined.

The device as disclosed herein also comes in a semi-reclining seat option for car interiors. This option is not as secure as the full version. Instead of fully enclosing around the seat, the top half of the pod pulls down, like a bonnet on a baby carriage, covering the top half of the occupant's body, and a separate portion pulls upward covering the bottom half of the body. However, this version uses the existing car seat as backing. It still offers more safety than a regular seat, but does not have a breakaway option in the case of a major accident. When this version is used in self-driving cars, it is attached to all the seats, offering safe and peaceful rest for all occupants in the vehicle.

The device as disclosed herein is adjustable to fit the size of its occupant and in some installations, adaptable for dual or multiple person occupancy.

The device as disclosed herein provides one or more of the following features:

- full body protection by having an indestructible "cocoon" or pod around the occupant's entire body
  - optional airbags inside the unit are not touching the body, unless deployed upon major impact
  - optional full reclining seat, or upright option, while still surrounded by the cocoon
  - the pod itself is flexible changing shape with the seat position
  - optional parachute can be attached to the cocoon for aircraft versions
  - optional floatable cocoon for sea-craft and aircraft versions
  - optional transponder included
  - the occupant feels completely safe, enough to calmly sleep, while inside the pod
  - the cocoon skin is made of Spider Silk or similar very strong flexible fabric.
  - the frame of the cocoon, upon which the skin is stretched over, is made of a strong and flexible metal, such as titanium, and takes the form of a hollow coil shape such as a "Slinky" toy
  - if needed, the pod could be airtight with an oxygenating device inside
  - potential lifesaver in case of fire and/or chemical disaster The pod is "adult size" with a universal connector attached to the base of the seat. It is not meant to be portable as it connects to the floor of whichever mode of transport. The pod protective cocoon is lightweight, but the seat is a typical modern, slim, airline style, including seatbelt.

Regarding ventilation, for now, the pods are not necessarily airtight. If an airtight version is needed for a specific use, it is equipped with a battery operated ventilator.

BRIEF DESCRIPTION OF THE DRAWINGS

FIG. 1 is a schematic isometric view of one embodiment of an apparatus according to the present invention.

FIG. 2 is a schematic side elevational view of the embodiment FIG. 1 showing the seat in a recline position and the pod flexed to accommodate the position of the passenger on the seat.

DETAILED DESCRIPTION

The apparatus as shown comprises a seat 10 with a base 12 and back 14 mounted on a support 16 for attachment to a vehicle.

The seat is surrounded, as in a cocoon, by a semi rigid pod or skin 18 which envelops at least the passenger on the seat or in some cases both the seat and passenger.

The frame of the cocoon 20, upon which the skin is stretched over, is made of a strong and flexible metal, such as titanium, and takes the form of a hollow coil shape such as a "Slinky" toy.

The apparatus shown in the figures is arranged to provide a lifesaving, cocoon during travel and includes the seat 10 arranged to be mounted in a vehicle 11. The pod unit 18 includes a rounded, semi-rigid wall or skin 18 surrounding and securely enclosing a human body (not shown) on the seat. The pod unit comprises the outer skin 18 of a flexible material supported on an interior frame 20. The outer skin of the pod unit is made of spider silk or other flexible lightweight fabric material which is transparent or opaque and can flex and stretch sufficiently to follow the shape of the frame 20 and the body of the passenger.

The frame 20 upon which the skin is stretched over is made of a strong and flexible wire material which allows the frame to flex to different locations with the skin carried thereby and remaining stretched thereon. This can be titanium, steel or a plastic material as suitable. The frame 20 upon which the skin is stretched over takes the form of a hollow helical coil shape to define the shape of the pod as oval in exterior shape. The pod unit is oval shaped with upper and lower ends 21 and 22 which are narrower than a central area 23. The ends can be open as shown or can be closed by a portion of the fabric.

The pod unit can be opened by providing separate top and bottom sections separated a center dividing line 24. The pod unit opens by sliding the top section partially across the bottom half, leaving an opening at the dividing line 24 for an occupant to enter and exit. Alternatively the pod unit opens by pivoting relative to a hinge line at the dividing line 24 on the bottom portion, leaving an opening for an occupant to enter and exit.

Inside the pod, the occupant sits on a fully reclining airplane style seat 14 where reclining is controlled manually or electronically by a control unit 25.

The flexibility of the pod material allows the form of the pod to adapt both at the fabric and the frame as the occupant changes seating positions.

The seat 14 connects to the interior of any mode of transportation 11 by a mounting 16 where the connection 27 between the seat and the vehicle is designed to break away in case of major impact for example via an electromagnetic system.

When used in an aircraft, there is provided a parachute 28 attached to the seat which deploys for a safe landing. Also a flotation device 29 can be provided which can deploy when required.

The interior of the cocoon can be designed for ultimate comfort, such as provided in an aircraft or high-class transportation. This can include, but not limited to:

An audio and visual display such as a thin flexible LED (light-emitting diode) screen display.

A sound system.

Electronically dimmable wall panels controlled by the occupant. This can be provided for models constructed with transparent walls or walls which are reduced light transmission. In some cases, the surface may be adjustable to change an amount of light transmission.

A thin, lightweight, soundproofing material as part of the wall liner.

An air filtration system providing filtered airflow with optional temperature control.

Where required depending on the type of vehicle within which it is mounted, the support for ultimate comfort, may include an air ride suspension or similar type of shock absorber which forms part of the mounting system.

The apparatus may be powered by an on-board rechargeable battery and/or connected directly to the vehicular power supply on which it is installed.

The apparatus may include an on-board transponder and/or a land/air/sea GPS (global positioning system) tracking device in the event that the apparatus is released into the sea on an accident.

The invention claimed is:

1. An apparatus arranged to provide a lifesaving, cocoon during travel comprising:

a seat arranged to be mounted inside a passenger transportation vehicle;

a pod unit connected to the seat and including a hollow interior arranged to receive and enclose an occupant when seated on the seat;

wherein the pod unit comprises an interior frame and an outer skin of a flexible material supported on the interior frame;

wherein the interior frame takes the form of a coil coiled in a helical manner around the hollow interior;

wherein the outer skin comprises a flexible material which is stretched over the interior frame for the pod unit to flex to different locations with the outer skin carried thereby and remaining stretched thereon.

2. The apparatus according to claim 1 wherein the outer skin of the pod unit is made of spider silk.

3. The apparatus according to claim 1 wherein the pod unit is oval in exterior shape so that the coil coiled in a helical manner around the hollow interior has a smaller diameter at each of two ends and a larger diameter at a position between the ends.

4. The apparatus according to claim 1 wherein the pod unit includes top and bottom sections which are movable to allow the pod unit to be opened.

5. The apparatus according to claim 4 wherein the pod unit opens by sliding the top section partially across the bottom section, leaving an opening for the occupant to enter and exit.

6. The apparatus according to claim 4 wherein the pod unit opens by pivoting the top section relative to a transverse hinge line at the bottom section, leaving an opening for the occupant to enter and exit.

7. The apparatus according to claim 1 wherein the seat comprises a reclining seat.

8. The apparatus according to claim 7 wherein the reclining seat is controlled manually or electronically.

9. The apparatus according to claim 1 wherein the pod unit is arranged to flex to different locations with the outer skin carried thereby and remaining stretched thereon to adapt as the occupant changes seating positions.

10. The apparatus according to claim 1 wherein there is provided a parachute attached to the seat.

11. The apparatus according to claim 1 wherein the pod unit includes a soundproofing material as part of the outer skin.

12. The apparatus according to claim 1 wherein the pod unit includes an air filtration system providing filtered airflow into the hollow interior.

13. An apparatus arranged to provide a lifesaving, cocoon during travel comprising:

a seat having a connector member for connection to a passenger transportation vehicle;

a pod unit connected to the seat and including a hollow interior arranged to receive and enclose an occupant when seated on the seat;

wherein the pod unit comprises an interior frame and an outer skin of a flexible material supported on the interior frame;

wherein the interior frame takes the form of a coil coiled in a helical manner around the hollow interior;

wherein the outer skin comprises a flexible material which is stretched over the interior frame for the pod unit to flex to different locations with the outer skin carried thereby and remaining stretched thereon;

and wherein connector member includes a release system which is designed to release the pod unit and the seat from the passenger transportation vehicle in case of impact of the passenger transportation vehicle.

14. The apparatus according to claim 13 wherein the outer skin of the pod unit is made of spider silk.

15. The apparatus according to claim 13 wherein the pod unit is oval in exterior shape so that the coil coiled in a helical manner around the hollow interior has a smaller diameter at each of two ends and a larger diameter at a position between the ends.

16. The apparatus according to claim 13 wherein the pod unit opens by pivoting the top section relative to a transverse hinge line at the bottom section, leaving an opening for the occupant to enter and exit.

17. The apparatus according to claim 13 wherein the pod unit is arranged to flex to different locations with the outer skin carried thereby and remaining stretched thereon to adapt as the occupant changes seating positions.

18. The apparatus according to claim 13 wherein there is provided a parachute attached to the seat.

19. The apparatus according to claim 13 wherein the pod unit includes a soundproofing material as part of the outer skin.

20. The apparatus according to claim 13 wherein the pod unit includes an air filtration system providing filtered airflow into the hollow interior.

* * * * *